(12) United States Patent
Abbas

(10) Patent No.: US 8,203,558 B2
(45) Date of Patent: Jun. 19, 2012

(54) DYNAMIC SHADER GENERATION

(75) Inventor: Gregory B. Abbas, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 1108 days.

(21) Appl. No.: 12/021,295

(22) Filed: Jan. 28, 2008

(65) Prior Publication Data

US 2009/0189897 A1    Jul. 30, 2009

(51) Int. Cl.
- *G06T 15/50* (2011.01)
- *G06T 15/30* (2011.01)
- *G06T 1/20* (2006.01)
- *G06F 15/16* (2006.01)
- *G06F 13/14* (2006.01)
- *G09G 5/00* (2006.01)

(52) U.S. Cl. ........ 345/426; 345/423; 345/502; 345/506; 345/519; 345/582

(58) Field of Classification Search ................ None
See application file for complete search history.

(56) References Cited

U.S. PATENT DOCUMENTS

| 6,578,197 B1 | 6/2003 | Peercy et al. |
| 6,809,732 B2 | 10/2004 | Zatz et al. |
| 7,218,291 B2 | 5/2007 | Abdalla et al. |
| 2005/0140672 A1 * | 6/2005 | Hubbell .................... 345/426 |
| 2006/0082577 A1 * | 4/2006 | Carter ....................... 345/426 |
| 2007/0018980 A1 | 1/2007 | Berteig et al. |
| 2007/0091089 A1 * | 4/2007 | Jiao et al. .................. 345/426 |
| 2007/0182746 A1 * | 8/2007 | Jiao et al. .................. 345/502 |
| 2008/0012874 A1 | 1/2008 | Spangler et al. |
| 2008/0303835 A1 | 12/2008 | Swift et al. |
| 2010/0328325 A1 | 12/2010 | Sévigny et al. |
| 2010/0328326 A1 | 12/2010 | Hervas et al. |
| 2010/0328327 A1 | 12/2010 | Hervas et al. |
| 2010/0329564 A1 | 12/2010 | Hervas et al. |

OTHER PUBLICATIONS

Michael McCool, "Chapter 7. Shader Metaprogramming with Sh", *A Short Introduction to Sh*. Apr. 25, 2005, pp. 1-25.
Portions of prosecution history of U.S. Appl. No. 12/496,639, Aug. 18, 2009, Hervas, Arnaud, et al.

* cited by examiner

*Primary Examiner* — Tize Ma
(74) *Attorney, Agent, or Firm* — Adeli & Tollen LLP

(57) ABSTRACT

Some embodiments provide a method of performing several shading operations for a graphic object in a scene that is displayed on a device. The device includes several processing units. The method receives a set of criteria that can define a set of parameters that relate to the shading operations. The method determines an allocation of the shading operations to the processing units based on the received criteria. The method allocates the shading operations to the processing units based on the determined allocations. The method renders the graphic object based on several instructions that comprise the shading operations. In some embodiments, the set of criteria is received during execution of the operations.

18 Claims, 23 Drawing Sheets

```
const char* linearGradientFloatProgramString =
"!!ARBfp1.0 \n"
"TEMP s0, s1;\n"
"TEX s0, fragment.texcoord[0], texture[0], 1D; \n"
"MUL result.color.rgb, s0.a, s0;\n"
"MOV result.color.a, s0.a; \n"
"END \n";
```

*Figure 1*

```
static const char *kBilinearAlphaView =
"!!ARBfp1.0\n"
"TEMP sourceCoord, sourceColor;\n"
"MOV sourceCoord, fragment.texcoord[0];\n"
OZ_GL_FP_MAGNIFIER
OZ_GL_FP_BILINEAR_INTERP
OZ_GL_FP_ALPHA_VIEW
"END\n";
```

*Figure 2*

```
Program program;
Var lightDir = normalize(g1_LightSource[0].position.xyz);
Var diffuseColor = vertex.color.rgb *
        g1_LightSource[0].diffuse.rgb;
Var illum = dot(g1_NormalMatrix * vertex.normal);
program.fragColor = diffuseColor * illum;
```

*Figure 6*

```
//vertex
uniform vec3 lightDir;
varying vec3 diffuseColor;
varying float illum;
void main ( ) {
        diffuseColor = vertex.color.rgb *
                g2_LightSource[0].diffuse.rgb;
        illum = dot(g1_NormalMatrix * vertex.normal);
}

//fragment
varying vec3 diffuseColor;
varying float illum;
void main ( ) {
        program.fragment.fragColor = diffuseColor * illum;
}
```

*Figure 7*

```
int numLights = lights.size( );
Program * program = new Program;
for (int index = 0; index < numLights; ++index)
        program -> fragment.frag.Color +=
                surface->shade(lights[index]);
```

Delayed evaluation:

Data structures represent programs

*Figure 13*

```
Var n = normalize (surface_normal);
Var pos = object_position – eye_position;
Prog.fragColor = 0.5 * surface_color * dot
(light_position – object_position, n);
```

*Figure 16*

DYNAMIC SHADER GENERATION

FIELD OF THE INVENTION

The present invention relates to computer graphics and in particular to performing rendering effects.

BACKGROUND OF THE INVENTION

Shaders are software programs which are used by the rendering resources of a computer to calculate the color and shape of an object. Currently software libraries such as Open Graphics Library (OpenGL) and DirectX include shading functions in their Application Programming Interface (API). These libraries enable programmers to write programs that access hardware graphics features of a computer without having detailed knowledge of the underlying graphics hardware.

Shading languages such as OpenGL Shading Language (GLSL) are developed which are based on a high level programming language such as C or C++. These languages allow developers to avoid using assembly language or hardware-specific languages. The high-level OpenGL shading constructs are compiled to Graphical Processing Unit (GPU) machine language. Similarly, the assembly language, OpenGL Architecture Review Board (ARB) can be used from a high level programming language to develop shader programs as described further below.

There are different types of shaders such as vertex shaders, geometry shaders, and fragment (or pixel) shaders. Vertex shaders operate on datasets called vertices. Properties such as color and position of the vertices can be changed by the vertex shader. Geometry shaders operate on groups of individual vertices. Fragment (or pixel) shaders calculate the color value of individual pixels using the polygons produced by the vertex and geometry shaders. The set of vertices and/or pixels define the shape, color, and other properties of a graphics object. Generally, a shader includes all three (or at least the vertex and fragment) shaders. Code sections related to vertex shaders execute faster while code sections related to fragment shaders execute slower but produce finer results. In the following discussions, the terms shader (used alone) or shader program refer to all different variety of shaders while individual shaders are identified by their specific prefixes (vertex, fragment, geometry, etc.).

Graphics application programmers write the application in a high-level language such as C++ and write shaders in ARB or GLSL. The shader constructs are embedded as string constants in the high-level language. FIG. 1 illustrates an example of such a program written in C++. As shown, the program includes several string constants that include program statements in ARB. However, when the application requires a large number of different variants of a shader, then string constants become inconvenient because the shader variants have a lot of similar code that are copied and pasted from one to another.

The programmers also use macros to combine snippets of code. FIG. 2 illustrates an example of using macros to create shader programs in ARB. Macros such as OZ_GL_FP_MAGNIFIER are used to combine snippets of code. The resulting programs are, however, hard to debug, understand, or extend.

One alternative is to assemble shaders by programmatically concatenating strings. This approach results in C++ code that is complicated and hard to write or maintain, because assembling shaders out of lots of small string snippets is hard to read. The C++ code has to manage what operations go into the vertex shader and what operations go into the fragment shader and which variables (e.g., uniform, attribute, or varying) are needed to support them. Complexity of that task limits the use of this alternative. Furthermore, assembling strings at runtime requires making sure about all different ways that the strings may need to be combined to produce a valid program.

For instance, when a shader application has a mask, a blend mode, and lighting, it becomes too complex to include all three areas into one shader since each has its own issues to manage. Masking supports multiple inputs with different Boolean operators, bending supports operations such as gamma correction and bilinear sampling, and lighting supports multiple instances of several different kinds of light sources. It becomes too complex to take several components of an imaging operation and integrate them to make a dynamic shader.

When trying to combine different calculations together to make dynamic shaders, one main challenge would be to determine which calculations should be done by the main CPU, the vertex processor, or the fragment processor. Decisions are to be made as how often to perform different parts of the shader, e.g., once for every single pixel, once per vertex, or just once per object. Calculations should be done at a high frequency by a fragment shader if necessary, but otherwise should be done at a low frequency (by vertex shader or CPU) for better performance. One example of an existing shader program is SH. SH allows the use of a high-level program language constructs. However, the instructions written in SH, has to be specifically allocated to either vertex or fragment shaders with no flexibility to allocate instructions to each shader at runtime.

There is, therefore, a need in the art for a framework that can represent shading calculations and let a user manipulate them, even if they come from different modules of the application. It is also desirable to be able to combine different shader pieces of code together, automatically eliminating unnecessary steps and combining redundant steps. It is further desirable to have a framework to either figure out optimal frequencies automatically or allow manual control over what gets done by CPU, vertex shader, or fragment shader.

SUMMARY OF THE INVENTION

Some embodiments provide a method of performing several shading operations for a graphic object in a scene that is displayed on a device. The device includes several processing units. The method receives a set of criteria that can define a set of parameters that relate to the shading operations. The method determines an allocation of the shading operations to the processing units based on the received criteria. The method allocates the shading operations to the processing units based on the determined allocations. The method renders the graphic object based on several instructions that comprise the shading operations. In some embodiments, the set of criteria is received during execution of the operations.

Some embodiments provide a method of shading a graphic object based on a set of shading instructions. The method determines a frequency of computation for each of the shading instructions based on a set of rendering criteria. The method allocates each of the shading instructions to one of several shader programs, each of the shading programs utilize a different set of input data and a different frequency of computation for each input data. The method renders the graphic object by using the shader programs. In some embodiments, the set of shading instructions are allocated to the shader programs during an execution of an object program, the object program generated from a source program written in a high-level programming language. In some embodiments, the set of rendering criteria is received after the object program is generated.

BRIEF DESCRIPTION OF THE DRAWINGS

The novel features of the invention are set forth in the appended claims. However, for purpose of explanation, several embodiments are set forth in the following figures.

FIG. 1 illustrates an example of a program with shader constructs embedded as string constants in a high-level language.

FIG. 2 illustrates an example of using macros to create shader programs.

FIG. 6 illustrates an example of a snippet of code that declares a program object and computes diffuse lighting from a single source in some embodiments.

FIG. 7 illustrates the code generated in some embodiments for different shaders based on the example shown in FIG. 6.

FIG. 8 illustrates an example of a snippet of code in some embodiments.

FIG. 13 illustrates an example of the code generated when gamma correct control is set to on in some embodiments.

FIG. 14 illustrates an example in some embodiments where the "per fragment" control is set to on.

FIG. 16 illustrates a snippet of code in some embodiments.

DETAILED DESCRIPTION OF THE INVENTION

Figure 3:
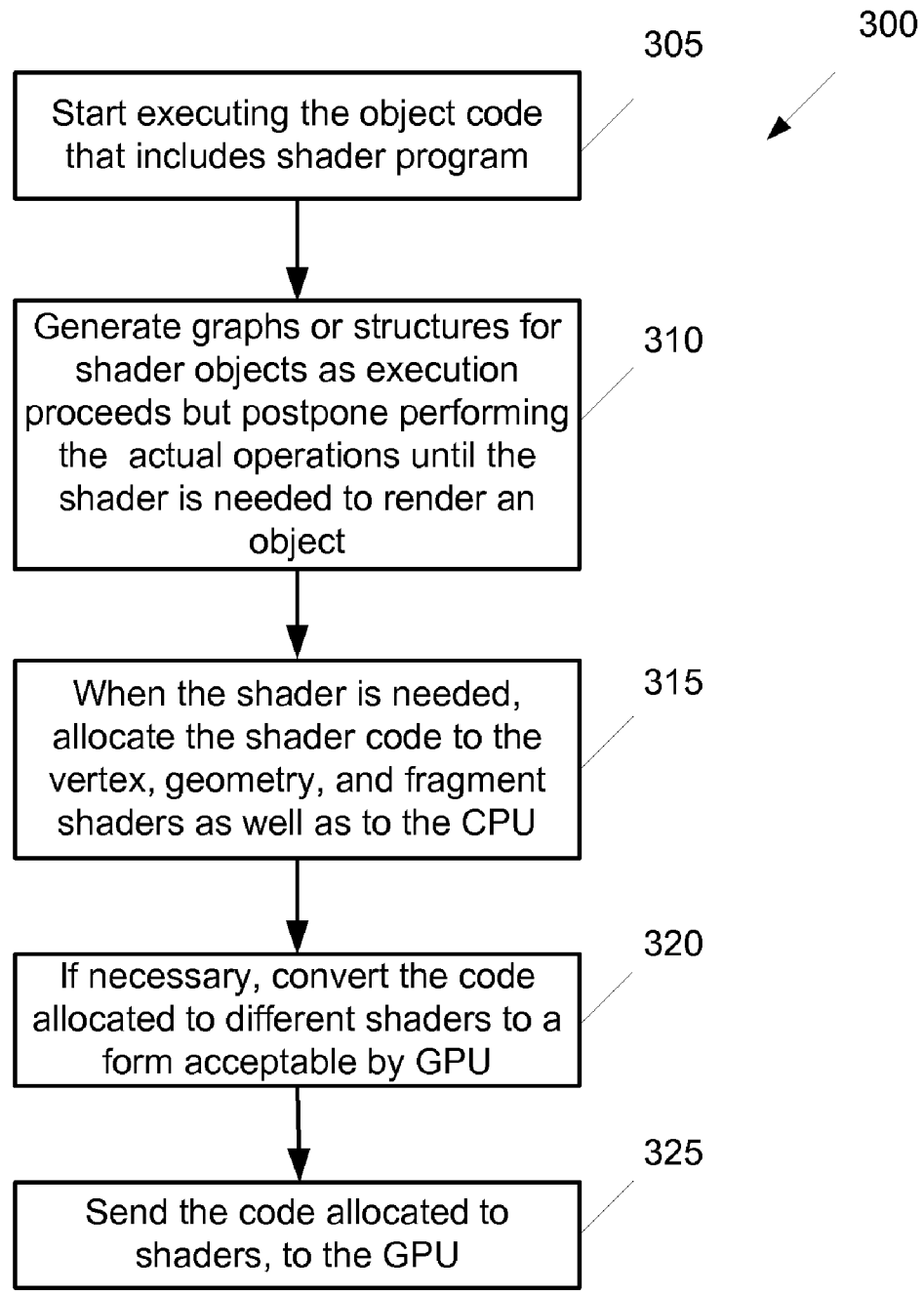
FIG. 3 conceptually illustrates a process that is used in some embodiment to shade a graphic object FIG. 4 conceptually illustrates a process that is used for shading a graphic object in some embodiments.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a method of performing several shading operations for a graphic object in a scene that is displayed on a device. The device includes several processing units. The method receives a set of criteria that can define a set of parameters that relate to the shading operations. The method determines an allocation of the shading operations to the processing units based on the received criteria. The method allocates the shading operations to the processing units based on the determined allocations. The method renders the graphic object based on several instructions that comprise the shading operations. In some embodiments, the set of criteria is received during execution of the operations.

Some embodiments provide a method for hiding computational frequencies of a shader program data items. These embodiments utilize a meta-compiler to automatically determine these computational frequencies. In these embodiments, the computational frequency strategy can be varied at runtime based on what graphics hardware is available, or based on different trade-offs between performance and visual quality.

Some embodiments provide a method of shading a graphic object based on a set of shading instructions. The method determines a frequency of computation for each of the shading instructions based on a set of rendering criteria. The method allocates each of the shading instructions to one of several shader programs, each of the shading programs utilize a different set of input data and a different frequency of computation for each input data. The method renders the graphic object by using the shader programs. In some embodiments, the set of shading instructions are allocated to the shader programs during an execution of an object program, the object program generated from a source program written in a high-level programming language. In some embodiments, the set of rendering criteria is received after the object program is generated.

Several more detailed embodiments of the invention are described in sections below. Specifically, Section I describes dynamic shader generation techniques of some embodiments. Next, Section II describes scheduling of computational frequencies in some embodiments. Finally, Section III provides a description of a computer system with which some embodiments of the invention are implemented.

I. Dynamic Shader Generation

Shaders must be compact to run efficiently. Some embodiments provide a method that allows writing shader programs using a high-level programming language. In some embodiments, the high-level programming language used supports the OpenGL API. These embodiments utilize the complexity management tools of the high-level programming language to simplify shader programming. The shader functions are provided in a set of libraries. Each library includes a set of shader functions. Although several examples in the following sections are shown that are based on C++ language, a person of ordinary skill in the art would realize that other high-level programming languages such as C, C#, Python, Java, etc., can be used without deviating from the teachings of the invention.

In some embodiments, metaprogramming is used to convert shader functions to code suitable for execution on one or more graphics processing units (GPUs). Metaprogramming is defined as dynamically generated code, or "code that writes code". Some embodiments utilize metaprogramming to use delayed evaluation to re-target computation from the CPU to the GPU.

FIG. 3 conceptually illustrates a high level process 300 that is used in some embodiments to shade a graphic object. As shown, the process starts executing (at 305) an object code that includes the shader program. In some embodiments, the object code is generated by compiling, linking, or interpreting a source code that is written in a high-level host language such as C, C++, C#, Python, Java, or the like. The source code includes shader objects.

Next, as the code is being executed on the CPU, the process generates (at 310) graphs or structures for shader objects but postpones performing the actual computations until a shader is required to render a graphic object. When the shader is needed to draw an object, the process allocates (at 315) code for different shader operations to the vertex, geometry, and fragment shaders. As described further below, some operations may be assigned to the CPU.

Next, for the code that is allocated to different shaders, if necessary, the process produces (at 320) a target code (such as ARB) that is suitable for execution on the GPU. Finally, the shader code is sent (at 325) to the GPU for execution in order to render the graphic object. Each of the above steps is described in further detail, below.

Figure 4:
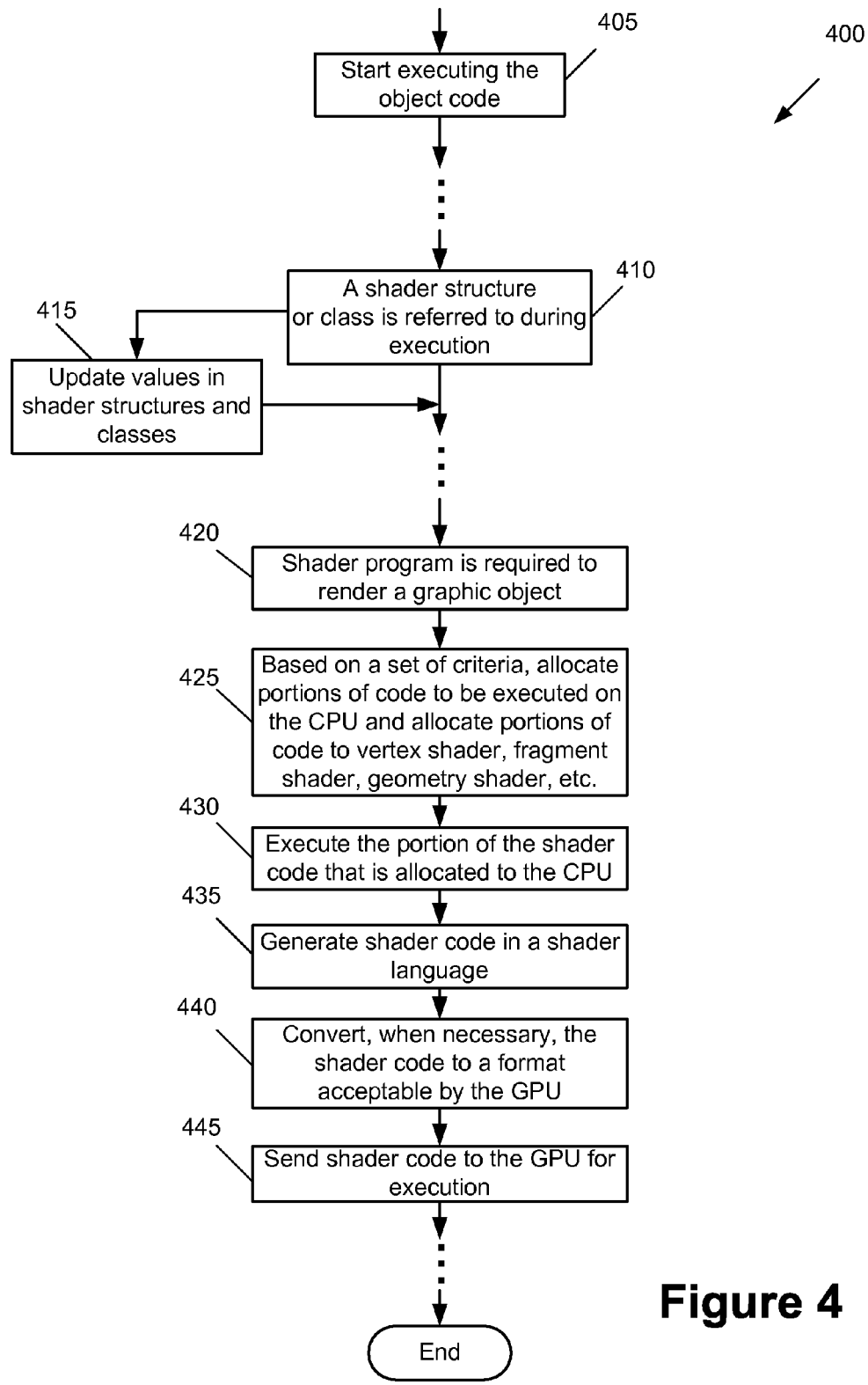

FIG. 4 conceptually illustrates a process 400 that is used for shading a graphic object in some embodiments. This process is described by referring to FIG. 5 that illustrates a conceptual diagram that shows flow of code and data in some embodiments. The dotted lines in FIG. 4 represent execution of instructions that are not related to shader program.

Figure 5:
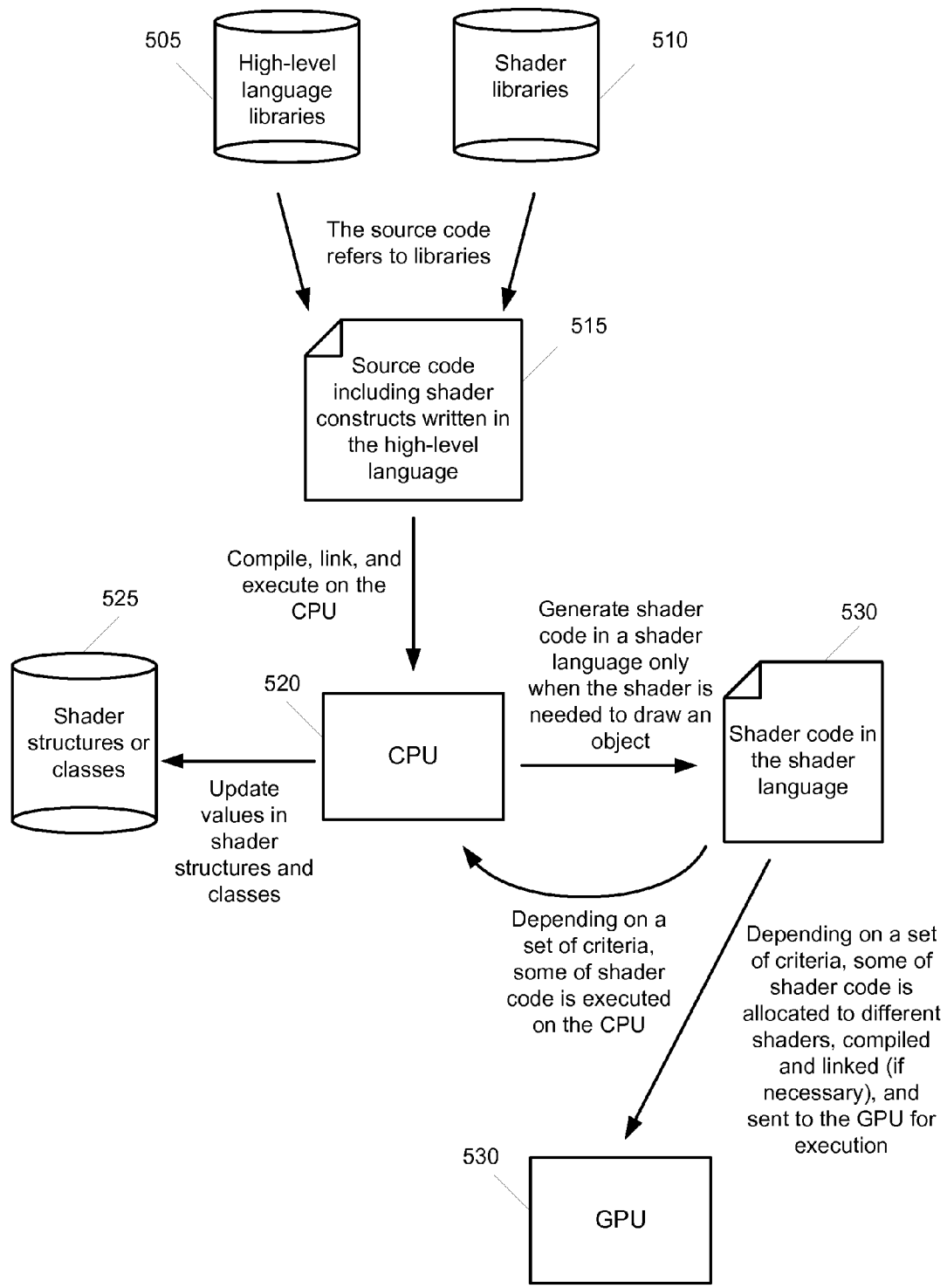
FIG. 5 illustrates a conceptual diagram showing flow of data and code for shading an object in some embodiments.

As shown in FIG. 4, the process starts executing (at 405) the object code. As described above, the object code is generated by compiling, linking, or interpreting a source code 515 that is written in a high-level host language. As shown in FIG. 5, the source code 515 utilizes a set of libraries 505 and 510. While the libraries 505 are the libraries of the high-level language, shader libraries 510 include shader functions generated using the novel techniques described in the current disclosure.

Functions provided in shader libraries follow the same syntax of the host high-level language. These functions can have names unique for a shader application or can have same name as functions of the host language, overloaded to be distinguished as shader functions. Overloading is a technique used in some high-level languages for reusing the same name for different functions or operators and relying on differences in the argument list to distinguish between them. The type and/or the number of arguments have to be different.

Therefore, the source code 515 includes library calls or shader constructs such as functions, structures, classes, operators, etc. which follow the syntax of the host language. The source code is then compiled, linked, or interpreted to generate the object code. The object code is executed on the central processing unit (CPU) 520 of the computer.

During the execution of the program, if any shader related constructs are invoked (at 410), the values associated with these constructs 525 are updated (at 415) without actually invoking the shader program. Although FIG. 4 only shows one instant of executing such shader related constructs for simplicity, many such construct can be included in the code and their execution can be mixed with the execution other code that are unrelated to shader program. Eventually, the process reaches (at 420) to a point where the function to shade an object is invoked.

When the shader program is required to render an object, the process 400 uses (at 425) a set of criteria to allocate the shader code to vertex, geometry, or vertex shaders. The process also based on the set of criteria allocates portions of code to be executed by the CPU (instead of the GPU).

FIG. 6 illustrates a simple example of a snippet of code in some embodiments. The code is written in C++ and declares a program object and computes diffuse lighting from a single source. The code in FIG. 6 uses uniform inputs (like gl_LightSource[0].position) and attribute inputs (like vertex-.color). However, during the execution of the object code generated from this program, the calculations aren't performed immediately. Instead, as is described below, when the shader is first used for drawing, shader code such as GLSL code is generated and passed to the OpenGL for compilation.

For the Example for FIG. 6, only the last part of the shader (i.e., multiplying diffuseColor by illum) must be evaluated in the fragment shader. The other multiplications (and the dot product) can be done in the vertex shader, and the normalization can be done on the CPU because its input is a uniform.

FIG. 7 illustrates the code generated in some embodiments for different shaders based on the example shown in FIG. 6. The set of criteria to determine whether the code must be allocated to the fragment shader, vertex shader, or the CPU is described further below.

Data types such as Var and Program shown in FIG. 6 are types defined in the shader libraries 510. Declaring lightDir as a type Var or program as a type Program will cause the host language (in this case C++) to use definitions found in these libraries for lightDir and Program. Also, as is described further below, when a statement such as program.frag.fragColor=diffuseColor*illum is executed, rather than immediate evaluation, will cause a data structure associated with shader in the form of a tree (or graph) to be created and/or updated. This graph is later on converted to shader language when the shader is used to render an object. In some embodiments, in order to invoke the shader to draw an object, an instruction such as program.use( ) is placed in the source code written in the high-level host language.

Referring back to FIG. 4, the process executes (at 430) the portion of the shader code that is allocated to the CPU. The process then generates (at 435) shader code 530 in a shader language such as GLSL. If necessary, the code is then converted (at 440) to a format that is acceptable by the GPU 530. In some embodiments, a high-level shader code, such as GLSL, is generated (at 435) and is passed (at 440) to OpenGL compiler to generate ARB which is executable by the GPU 530. Next, the process sends (at 445) the executable shader code to the GPU 530. The process then performs other non shader code (if any) and exits.

Although the shaders shown in FIG. 7 would have been easy to write by hand, if the application had to support a variety of types of light sources (ambient, directional, point, sopt, area, sky, etc.) interacting with a variety of reflectance functions (lambert, phong, blinn-phong, etc.) then defining light objects and surface objects that describe different parts of shader would have been much more complex.

II. Scheduling of Computational Frequencies

A. Use of Complexity-Management Tools of a High-Level Programming Language to Produce Shader Code Shaders must be compact to run efficiently. The use of a high-level programming language allows some embodiments to utilize the complexity management tools of the high-level programming language to simplify shader programming. In some embodiments, the task of shader writing can be delegated to various objects via virtual methods.

FIG. 8 illustrates an example of a snippet of code in some embodiments. In this example, "lights" is an array of C++ light objects and "surface" is a C++ surface shader object. Because the invention makes full access to C++ facilities available to a shader programmer, the programmer can use any patterns (such as iterators, visitors, etc.) in order to manage how different parts of the shader interact.

In the example of FIG. 8, the contribution of each light object is added to the color. As can be appreciated from the example of FIG. 8, the complexities (such as iterating over a set of lights) are expressed in the high-level language. However, instead of performing the operations immediately, as described in Section I, the operations are remembered (by saving the information in data structures and classes), translated into a different language and retargeted to be executed on the GPU. Other examples include making a strategy object for tone mapping or traversing a tree of mask operations (a composite pattern).

B. Delayed Evaluation

In some embodiments, invoking a shader structure or program member during the execution of the high-level language host program causes data structures to be created. Instead of immediately executing any instructions, a data structure is created to represent the desired action. This data structure will then be translated to shader language upon the first request to use the shader for rendering an object.

Figures 9, 10:
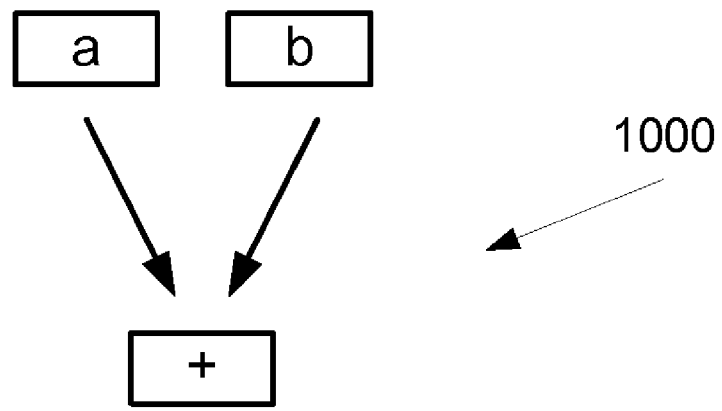
FIG. 9 illustrates a simple snippet of code in some embodiments.
FIG. 10 illustrates the result of delayed evaluation in some embodiments for the code shown in FIG. 9.

FIG. 9 illustrates a simple snippet of code in some embodiments. In an immediate execution scenario, the execution of this line of code results in an immediate addition operation which will update the value of c based on the current values of a and b (which must be available when the line of code is executed).

On the other hand, FIG. 10 illustrates the result of delayed evaluation of the same statement in some embodiments. As shown, the execution of the code results in creation of a data structure that will be stored and will be evaluated only when the shader is needed to render an object. Furthermore, the data structure can be allocated to either execute on the CPU or to be allocated to either the vertex shader or the fragment shader and execute on the GPU. The delayed evaluation, therefore, results in creating the data structure shown in FIG. 10 even when the values of "a" and "b" are still unknown.

It should be appreciated that FIG. 9 shows a simple addition operation. A structure such as 1000 is only generated when the line of code is executed as a result of execution of a line of code that is identified as shader code, e.g., during execution of an invocation of an entity defined in one of shader libraries 510 (shown in FIG. 5). On the other hand, when the line of code is not a part of the shader program (i.e., the line of code is executed in a portion of the high-level language code which is unrelated to shader program), the line of code is immediately executed.

C. Determining Computational Frequency

Values related to shader programs require different computational frequencies. While some values are constant, other values may require to be calculated once per pixel, once per vertex, or once per object. For instant, values related to a fixed light source can be uniform per object and need to be computed only once per object. Such values can be computed by the CPU (instead of the GPU). On the other hand, some values may require computation per vertex or per pixel.

Since the fragment shader performs computations for more points than the vertex shader (there are more pixels than vertices), if calculations can be moved to the vertex shader and still produce acceptable results, the resulting program will execute faster. In some embodiments, the decision to allocate different operations to different shaders (or the CPU) is made by considering a set of criteria. These criteria can be pre-determined and applied automatically and/or can be based on a set of criteria set by a user.

Figure 11:
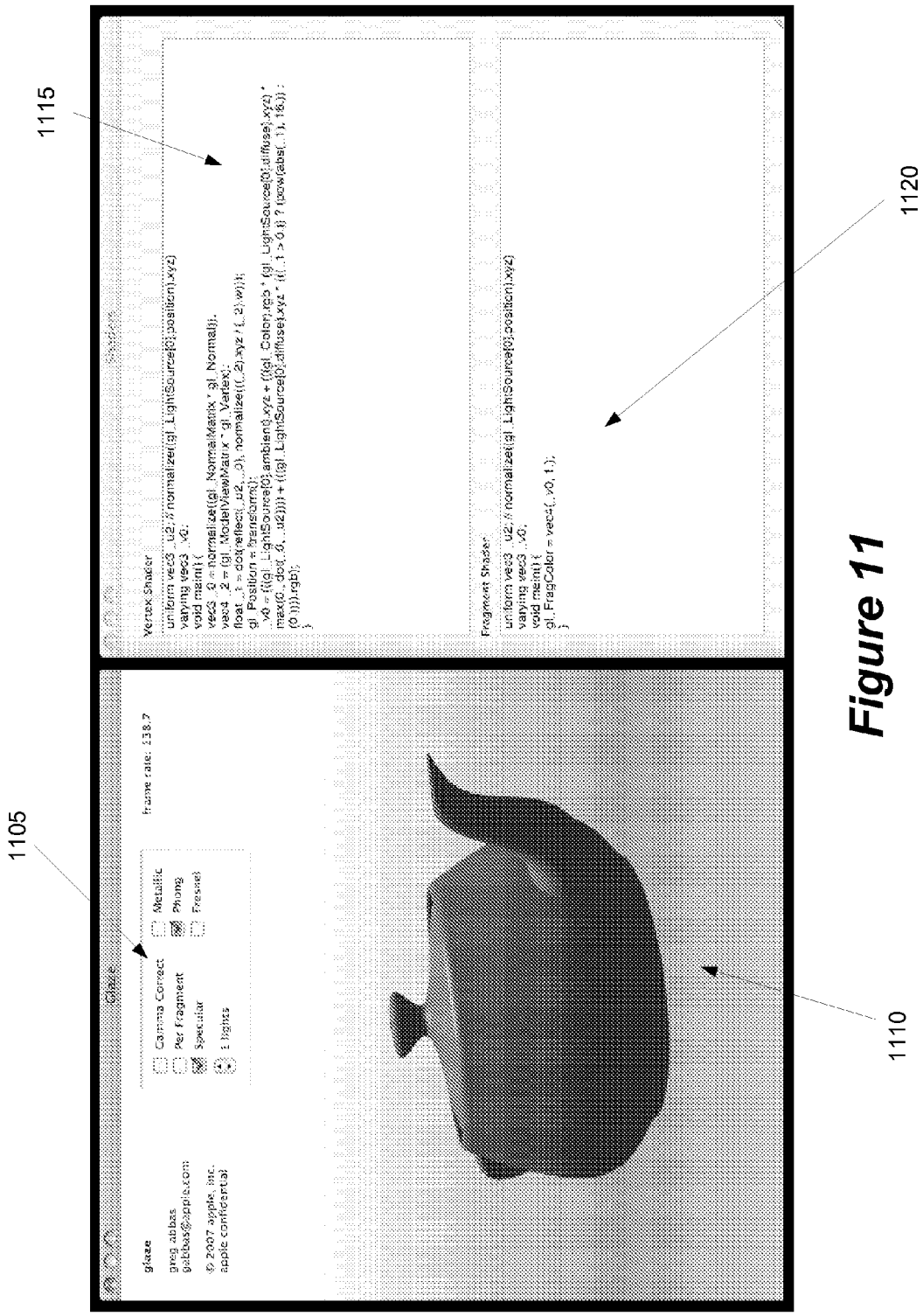
FIG. 11 illustrates an example of graphic object illuminated by one light source in some embodiments.

FIG. 11 illustrates an example of a tool that generates shader code in some embodiments. The tool includes a graphical user interface (GUI). As shown, a set of controls 1105 determines how a graphic object 1110 has to be rendered. For instant, FIG. 11 illustrates that one light source is currently selected to illuminate the object. The boxes 1115 and 1120 show the operation allocated to the vertex and fragment shaders respectively.

It should be appreciated that the example of FIG. 11 is just a simple example of an application with a user interface that uses the teachings of the current invention. The invention is, however, readily applicable to other applications. For instance, the invention can be used in applications (such as Motion™) that create and edit motion graphics, titling for video and film production, and two dimensional (2D) and three dimensional (3D) visual effects. When integrated in such an application, a set of controls such as controls 1105 will be provided by the application. An artist designing or editing a scene or animation can, for example, use the provided controls to change certain shader parameters for one or more graphical objects in a scene. The artist can then examine the results for different selections of controls to choose a desired combination and to render the scene. Depending on the parameters selected by the artist, different shader operations are allocated to different shaders during rendering of the scene.

Figure 26:
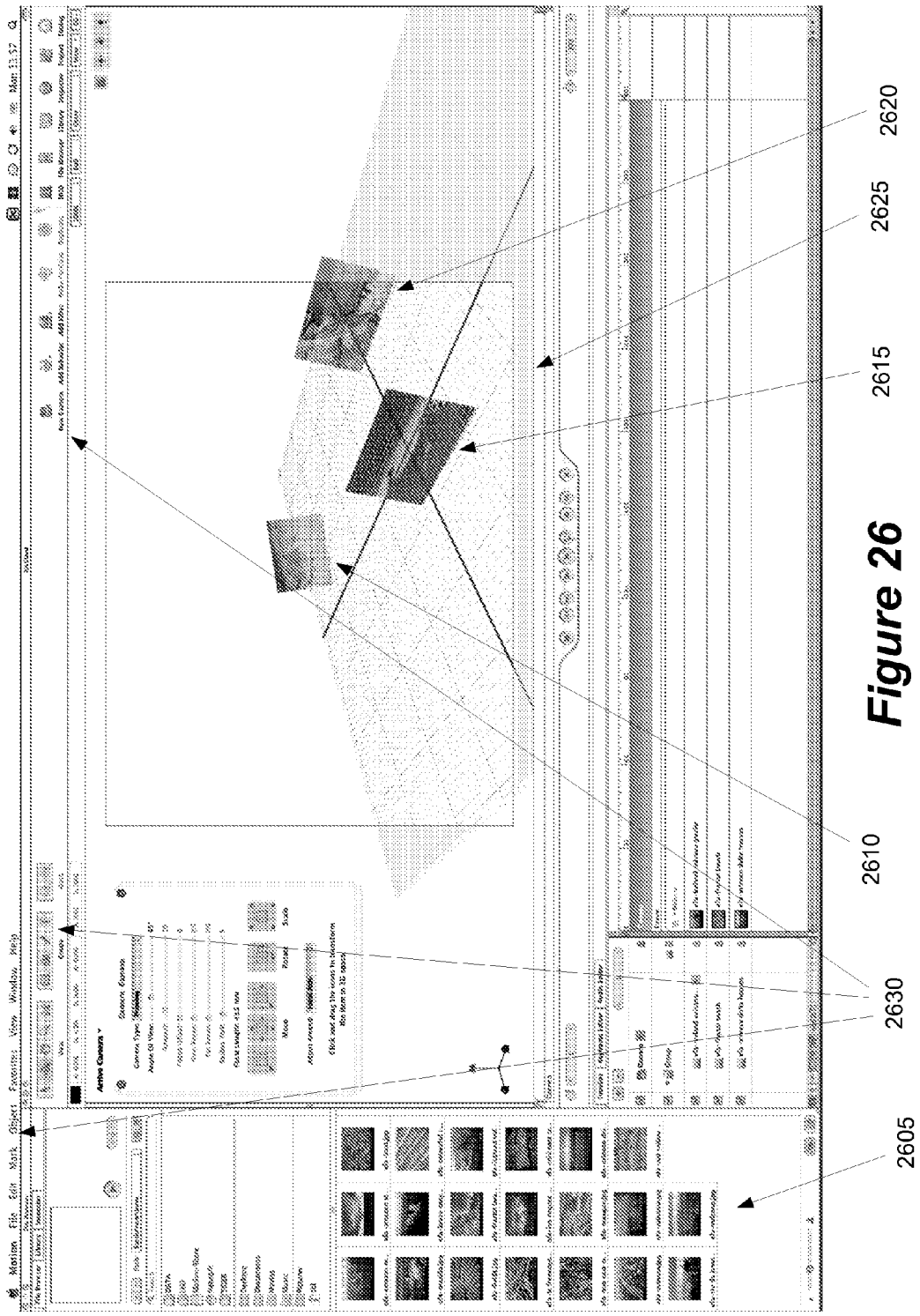
FIG. 26 illustrates an example of a graphics editing application in some embodiments.

FIG. 26 illustrates an example of a graphics editing application. As shown, from a set of available images 2605, a user has selected three video images 2610-2620. The selected pictures are moved to an editing area 2625 for editing (details of each control and other information in FIG. 26 are not shown for simplicity, since these specific details are not relevant to the current discussion). In some embodiments, the user is provided with a set of tools or commands 2630. In some embodiments, one of these user selectable tools or commands (not shown) results in a set of controls such as controls 1105 to be provided to the user. The user will then proceed to change different shader parameters for one or more graphic objects (such as 1110) in a scene. Also, in some embodiments, display of the actual shader code 1115 and 1120 produced as a result of changing different controls may be turned off so that the user is only concerned with changing the controls 1105 and observing the results on the rendered object or objects 1110.

Another example of the use of the invention is to integrate the invention in a product such as an interactive program (such as a game) or any other motion animation product. A user of such a product (e.g., a person playing the game or watching the animation) can be provided with a set of controls. The user can then change the controls (e.g., based on the capabilities of the user's device or computer). For instance, the user may elect to turn off some time consuming graphics features if the user equipment is too slow. The user may also change the settings for different aesthetic experience. The specific settings will then effect how different shader operations are allocated when the program is running (e.g., when the game is being played).

Also, a user of such a game or interactive application can change some parameters in real time by actually interacting with the application. For instance, during playing of a game, the user may decide that one of the game actors standing in a room shall open a door. Opening the door may result in an additional light source to illuminate the objects in the room. This additional light source might have the same effect on allocation of shader operations as changing one of the controls (e.g., number of lights) shown in box 1105.

Figure 12:
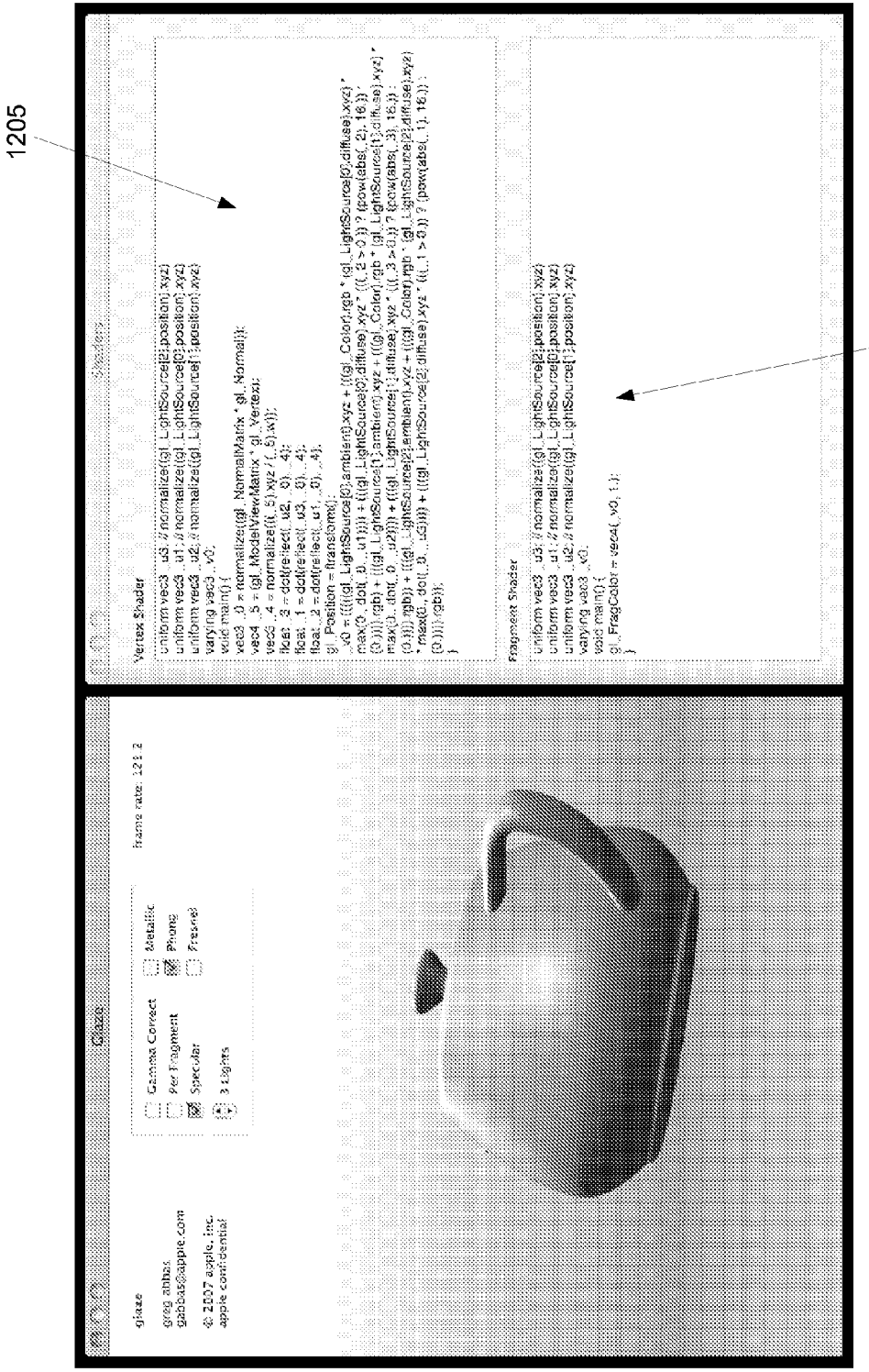
FIG. 12 illustrates a graphic object illuminated by several light sources in some embodiments.

FIG. 12 illustrates the same graphic object (shown as rotated from the position in FIG. 11). In this example, three light sources are selected to illuminate the object. As a result more code 1105 and 1110 is generated to accommodate the three light sources in the vertex and fragment shaders respectively.

Figure 13:
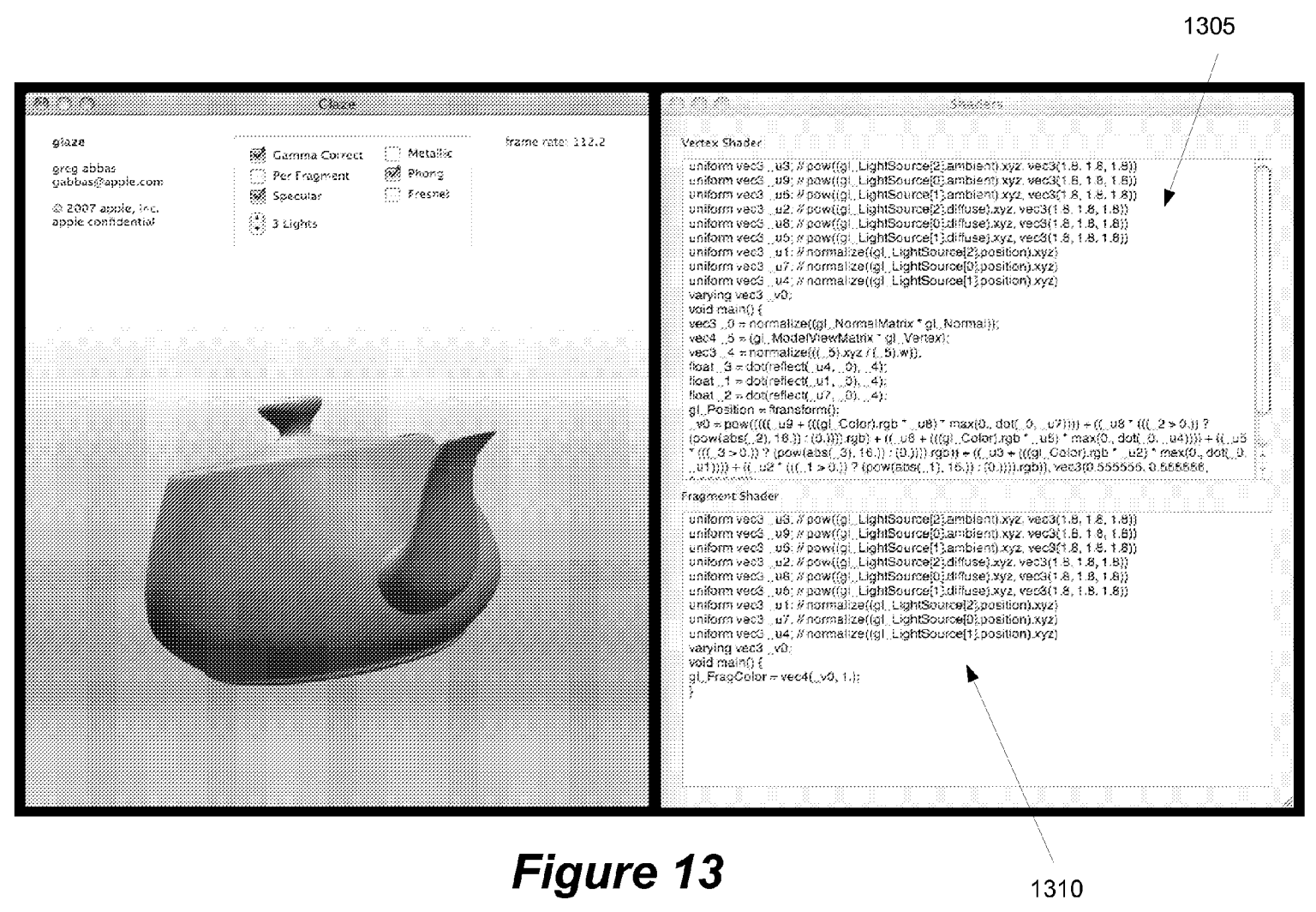

The examples of FIGS. 11 and 12 show several other user selectable controls. Specifically, these controls are gamma correct, per fragment, specular, metallic, Phong, and Fresnel. The gamma correct control determines whether or not lighting calculations are performed on linearized intensity values. When the gamma correction is off, the program runs faster but the results are not accurate or aesthetically pleasant. FIG. 13 illustrates an example of the code generated when the gamma correct control is set to on. As shown, more code 1305 and 1310 is automatically generated for the vertex and fragment shaders respectively.

Figure 14:
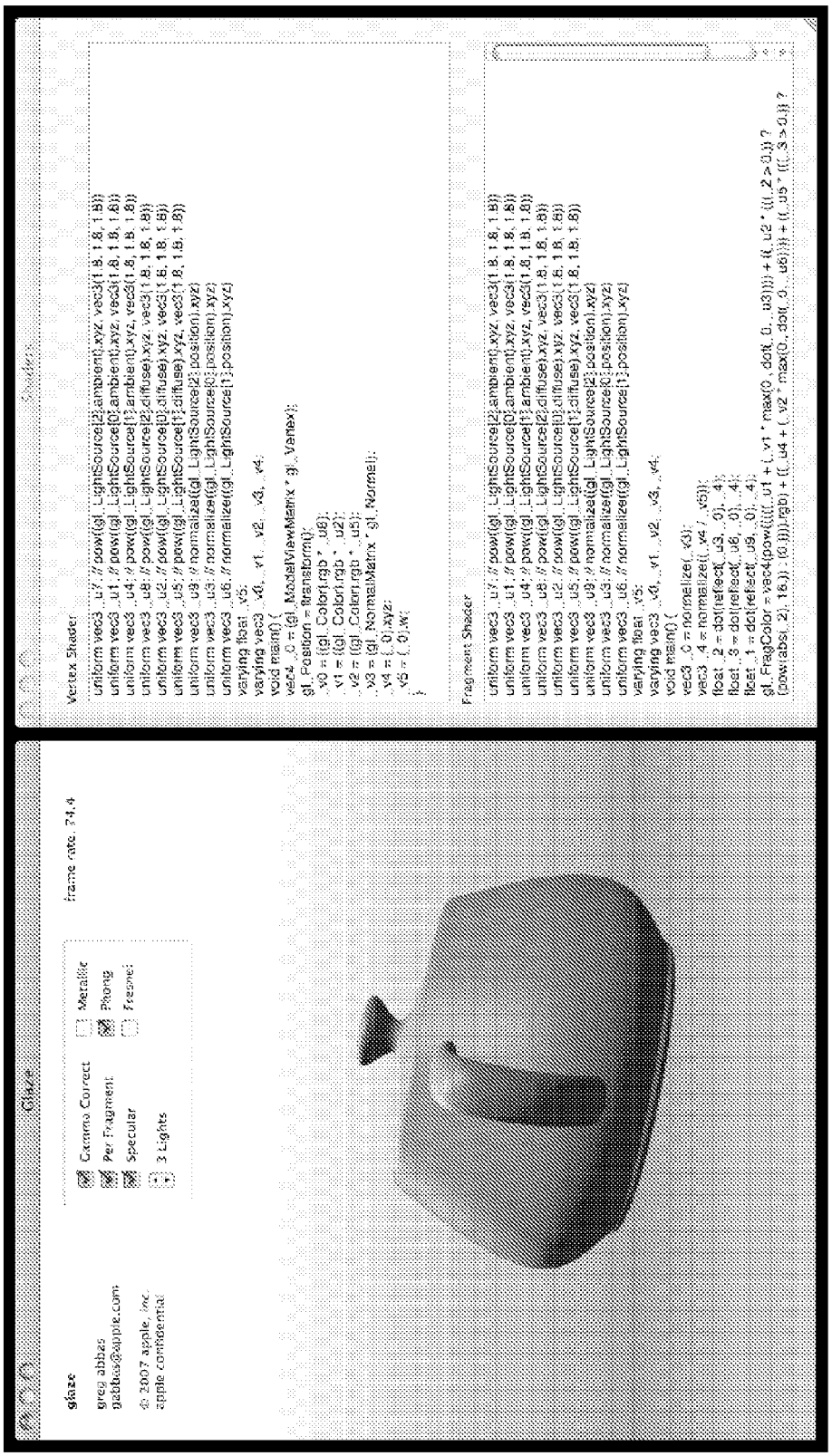

Setting the "per fragment" control on forces more code to be performed by the fragment shader. The result will be more accurate shading and slower program execution. FIG. 14 illustrates an example in some embodiments where the "per fragment" control is set to on. When the metallic control is on, it generates a metallic tone for the object. The Phong, Fresnel, and specular controls determine different reflection models for the object.

D. An Example of Allocating Shader Code

Figure 15:
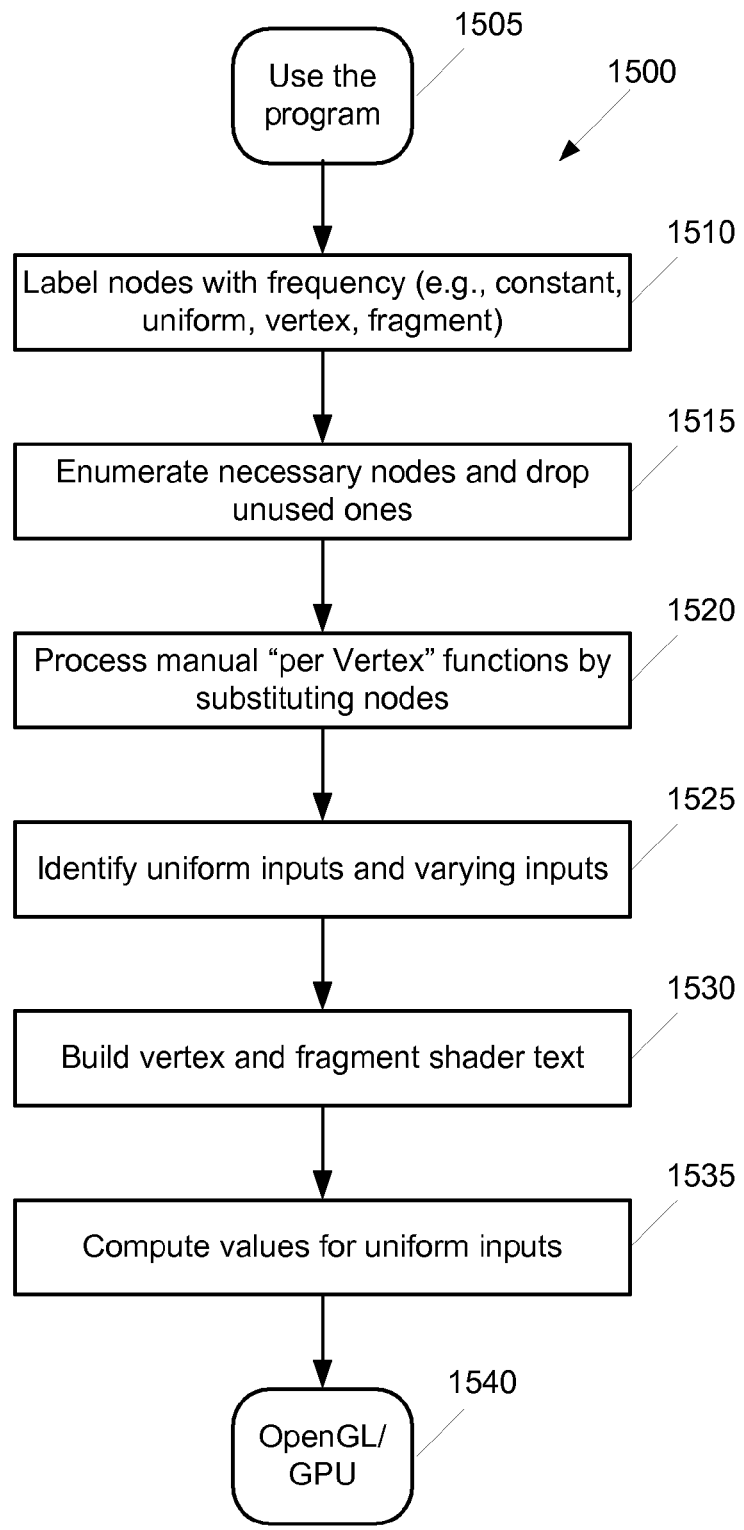
FIG. 15 illustrates a process for allocating shader code among different shaders programs and CPU in some embodiments.
Figure 17:
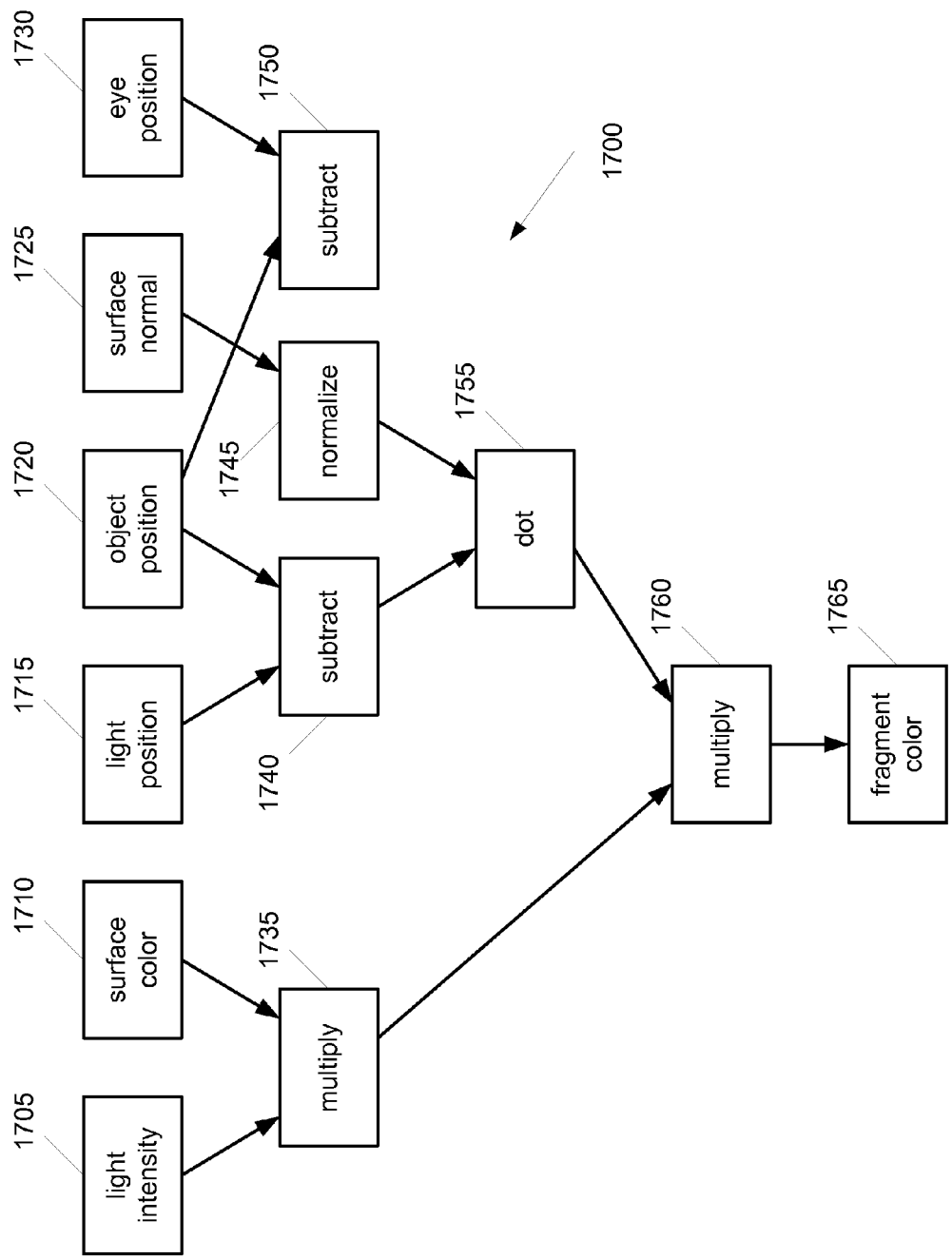
FIG. 17 illustrates an example of a graph generated for the snippet of code shown in FIG. 16.

FIG. 15 illustrates a process for allocating shader code among different shaders programs and the CPU. For simplicity, this example only refers to vertex and fragment shaders. A person of ordinary skill in the art would realize that the teaching of the invention can be easily expanded to include geometry or any other types of shaders. As shown, sometime during the execution of the high-level host program a request for using the shader program is invoked (at 1505). As described above, prior to this invocation, the shader constructs are built in a set of structures or graphs. For instance, FIG. 16 illustrates a snippet of code in some embodiments. FIG. 17 illustrates an example of a graph 1700 generated for the snippet of code shown in FIG. 16. This graph can be implemented by a structure, a class, an array, or any similar high-level language construct.

As shown in FIG. 17, the inputs to the graph are conceptually shown as the leaves of the graph 1700. Specifically, the inputs are light intensity 1705, surface color 1710, light position 1715, object position 1720, surface normal 1725, and eye-position 1730. The graph also shows different operations 1735-1760 performed on the inputs 1705-1730 and on the intermediate results (shown as arrows). The output of the graph is fragment color 1765. For this example, light intensity 1705 is assumed to be constant. Surface color 1710, light position 1715, and eye position 1730 are assumed to be uniform (i.e., the same for the surface of the object that is being rendered). Object position 1720 and surface normal 1725 (which is a vector that describes the orientation of a surface, i.e., a unit vector that points perpendicular to the surface) are assumed to be attributes (i.e., vertex data).

Figure 18:
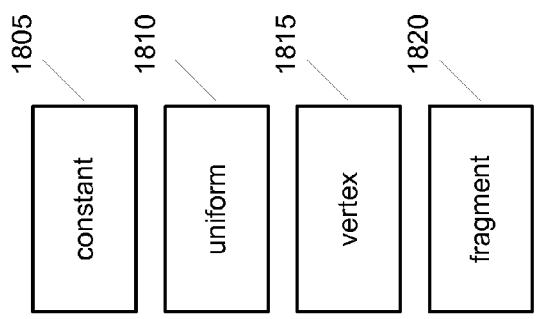
FIG. 18 illustrates examples of different type of data items that require different update frequencies in some embodiments.

Next, the process conceptually labels (at 1510) each node of these graphs with the frequency of update that is required for the particular node. FIG. 18 illustrates examples of different type of data items that require different update frequencies in some embodiments. Specifically, a "constant" data item 1805 is a data item that is known when the program is written and does not require any calculations throughout the execution of the program. A "uniform" data item 1810 is the same throughout the surface to which it is applied. Such a data item requires to be calculated once per surface being rendered. A vertex (or per-vertex) data item 1815 requires one calculation per vertex data. A fragment (or per-fragment) data item 1820 requires to be updated once per pixel. It should also be appreciated that, in some embodiments, per-vertex and per-fragment data items must also be updated once per each frame of a video sequence being rendered.

Figure 19:
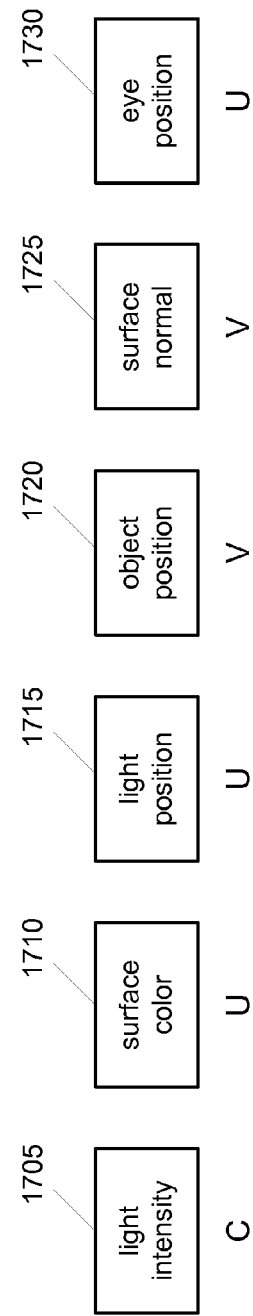
FIG. 19 illustrates the results of conceptually labeling each of the inputs of the graph of FIG. 17 in some embodiments.

FIG. 19 illustrates the results of conceptually labeling each of the inputs 1705-1730. As described in the above sections, different embodiments use different criteria to label nodes of the graphs (and subsequently assign the computations to different shaders and CPU). As shown in FIG. 19, in this specific example, the constant data item 1705 is labeled as constant (shown as "C"), the uniform data items 1710, 1715, and 1730 are labeled as uniform (shown as "U"), and the per-vertex data items 1720-25 are labeled as vertex (shown as "V"). No input data items are labeled as per-fragment.

Figure 20:
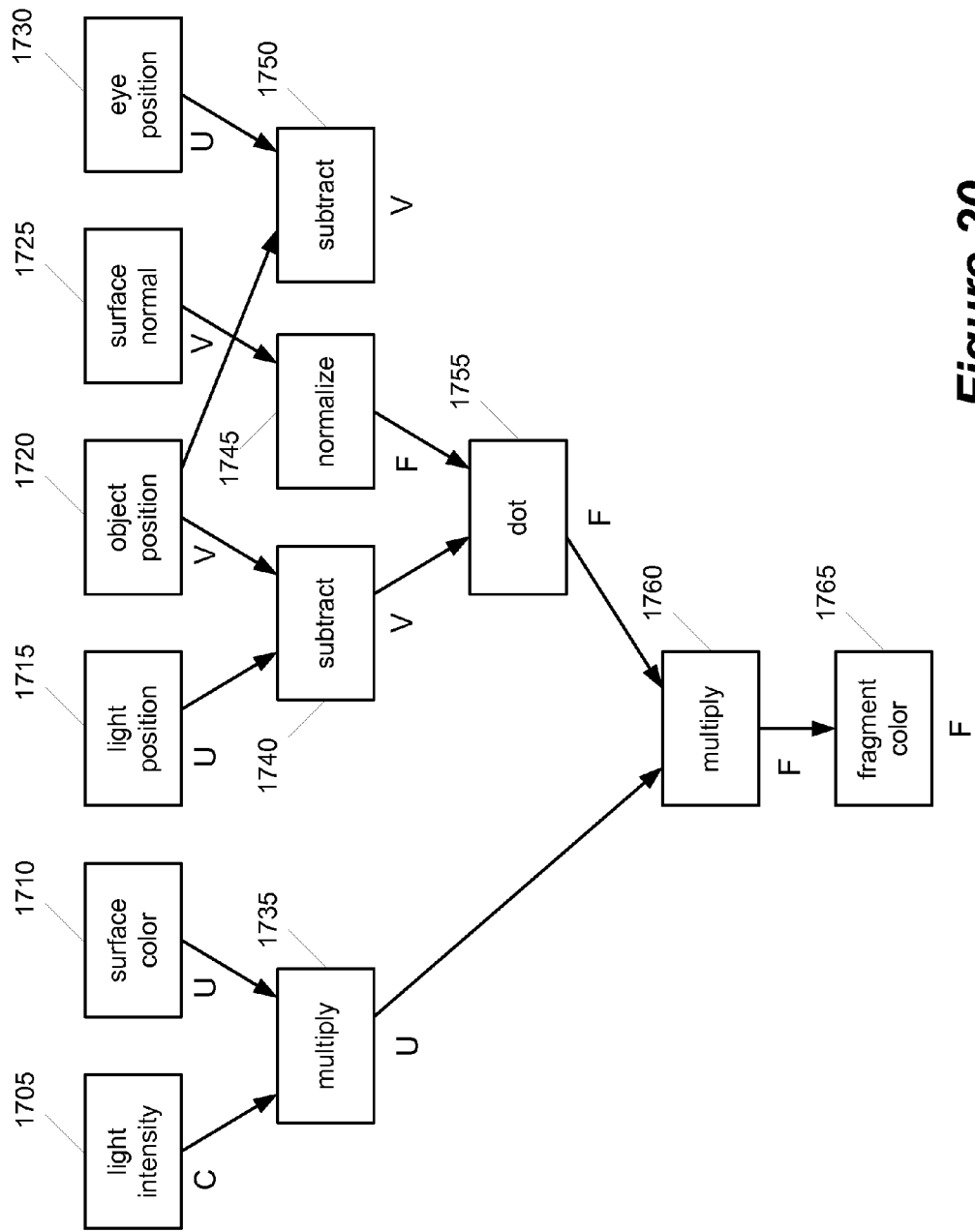
FIG. 20 illustrates the results of applying the labeling to some nodes of the graph shown in FIG. 17.
Figure 21:
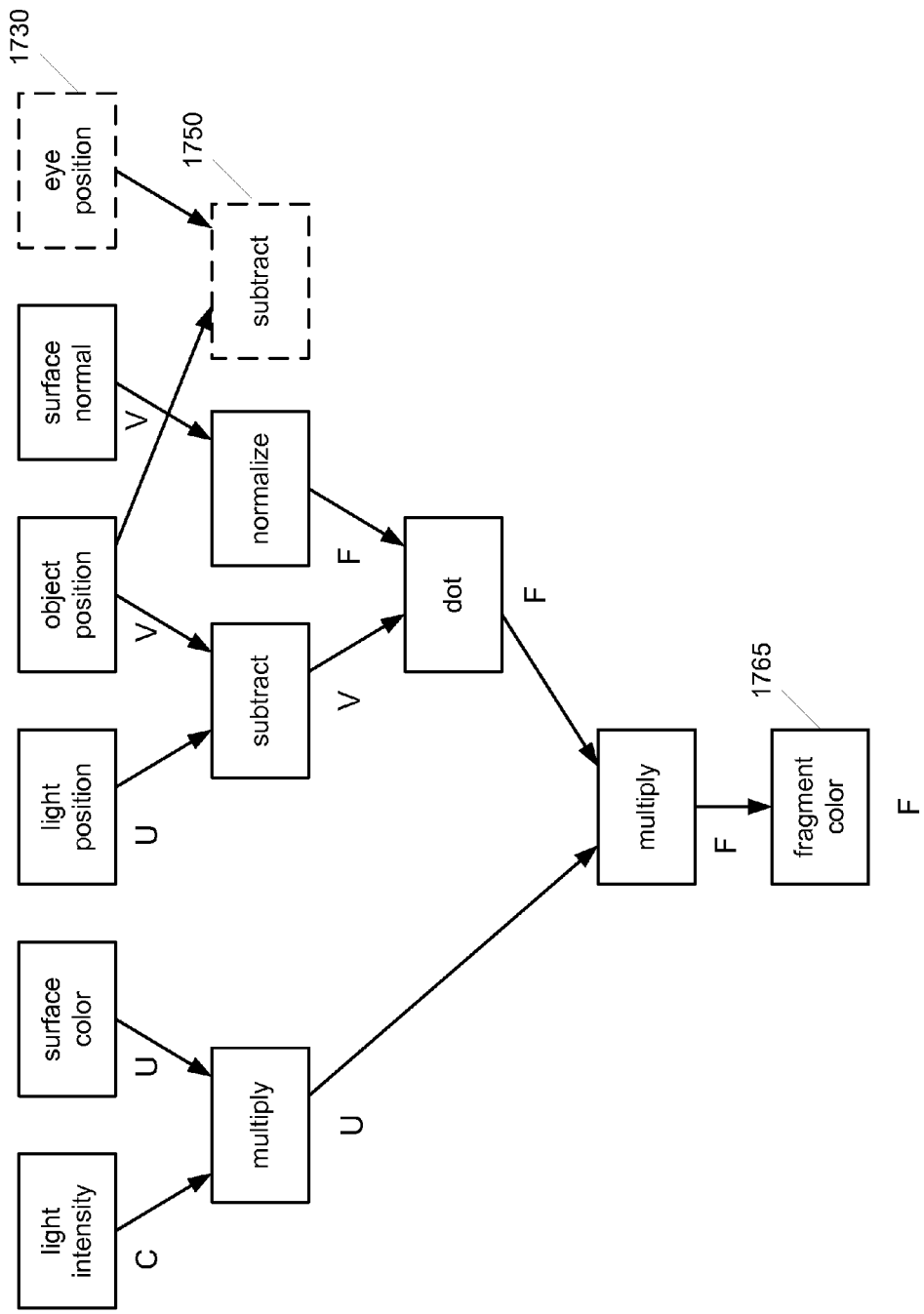
FIG. 21 illustrates the results of dropping some nodes of the graph shown in FIG. 17.

Referring back to FIG. 15, the process next enumerates (at 1515) the necessary nodes and drops the unused nodes. FIG. 20 illustrates the results of applying the labeling to other nodes of the graph 1700. In this specific example, each intermediate node 1735-1760 and the output node 1765 is labeled according to the inputs that the node receives. In some embodiments, each node is labeled with a frequency that is as high as the highest frequency of all its inputs or higher if necessary for accurate calculation. As shown, node 1735 is labeled as uniform, nodes 1740 and 1750 are labeled as per-vertex, and nodes 1745 and 1750-1765 are labeled as per-fragment (shown as "F"). FIG. 21 illustrates the results of dropping some nodes. As shown in FIG. 21, since eye position 1730 and the results of subtract operation 1750 are not used in computing the value of fragment color 1765, the nodes 1730 and 1750 of the graphs are dropped (shown with dashed lines).

Next, as shown in FIG. 15, the manual "per vertex" functions are processed (at 1520) by substituting nodes. These functions are functions that are specified in the code (hence the term manual) to be performed by the vertex shader. For instance, some embodiments provide a function called per-Vertex that can be used by a programmer to force the computations to be done by the vertex shader even if the computations would otherwise be allocated to the fragment shader. Therefore, in step 1520 all nodes currently labeled as per-fragment nodes which are specified in the code to be forced to vertex shader are re-labeled (i.e. substituted) as per-vertex.

Figure 22:
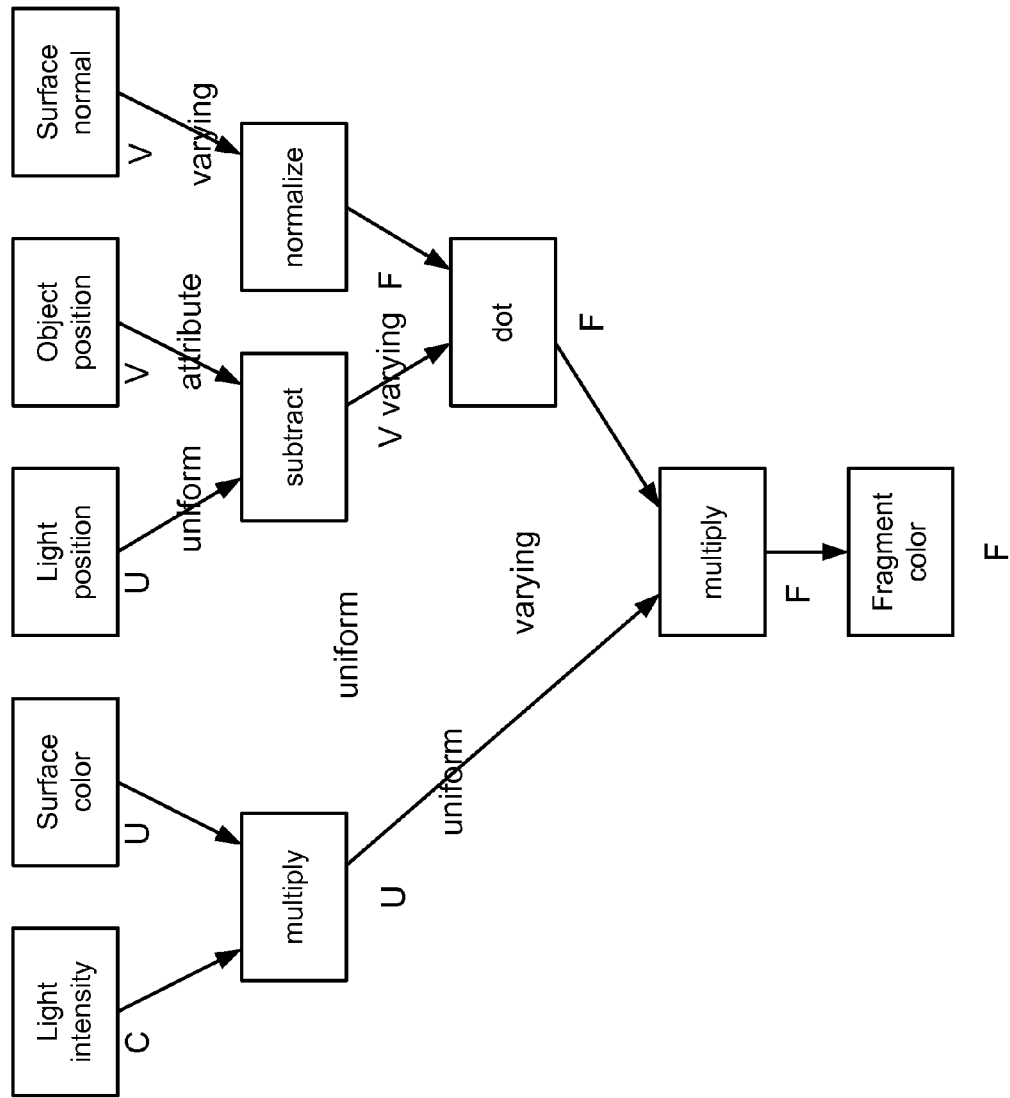
FIG. 22 illustrates the results of identifying uniform, attribute, and varying inputs for the graph shown in FIG. 17.

Next, the process identifies (at 1525) uniform input and varying inputs. In some embodiments, varying inputs are used to communicate between fragment and vertex shaders. In some embodiments, the uniform and varying inputs are identified by examining the edges in the graph where the output is vertex or fragment, but the input is not the same frequency. In some embodiments, the uniform inputs are identified by finding connections in the graph between uniform nodes and per-vertex or per-fragment nodes. Similarly, varying data is a junction from a per vertex node to a per-fragment node. The edges (shown as arrows) in the graph where the nodes on either side are not labeled the same are identified. The process does not apply to attributes, because the attributes are declared as such and their values are always specified directly in the code. FIG. 22 illustrates the results of identifying uniform, attribute, and varying inputs for the current example.

Figure 23:
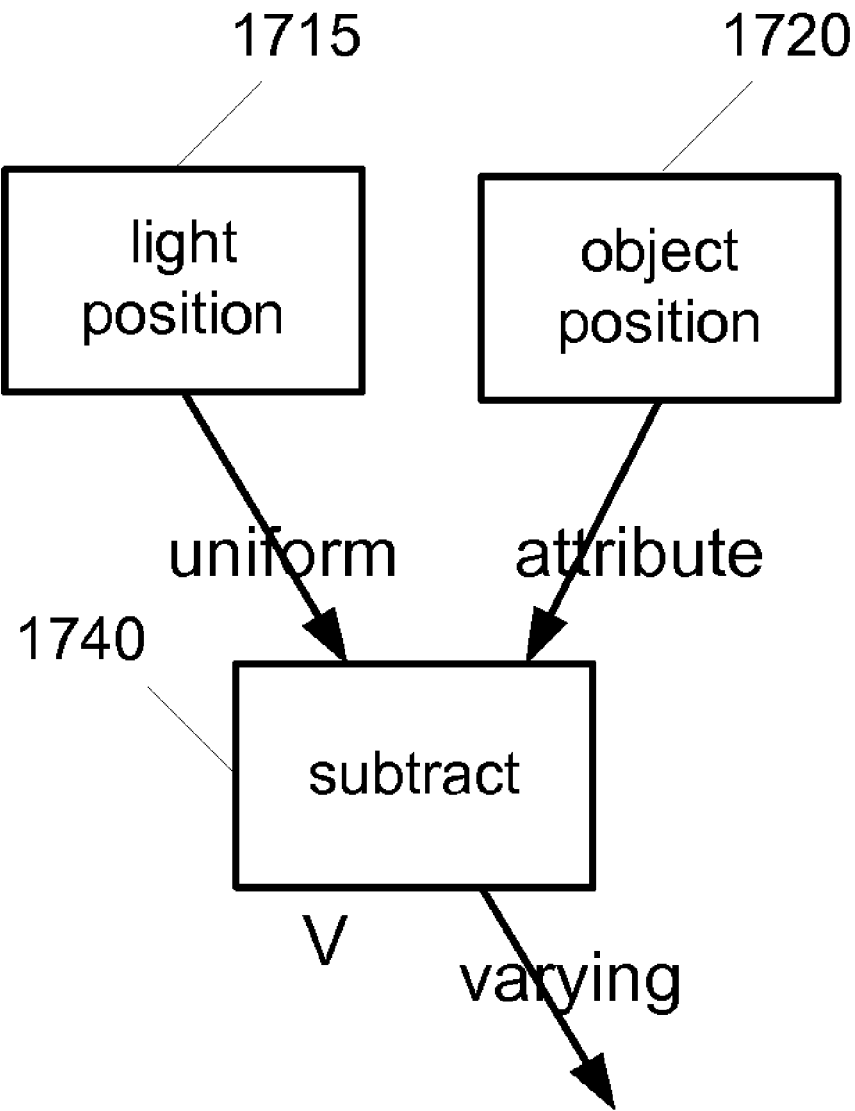
FIG. 23 illustrates the code allocated to the vertex shader for the graph shown in FIG. 17.

Next, as shown in FIG. 15, the process builds (at 1530) vertex and fragment shader text. In some embodiments, the vertex shader code is generated from nodes labeled as vertex (shown as "V"). FIG. 23 illustrates the code allocated to the vertex shader in the current example. As shown in FIG. 23, only the subtract operation 1740 is labeled as V and is allocated to the vertex shader.

Figure 24:
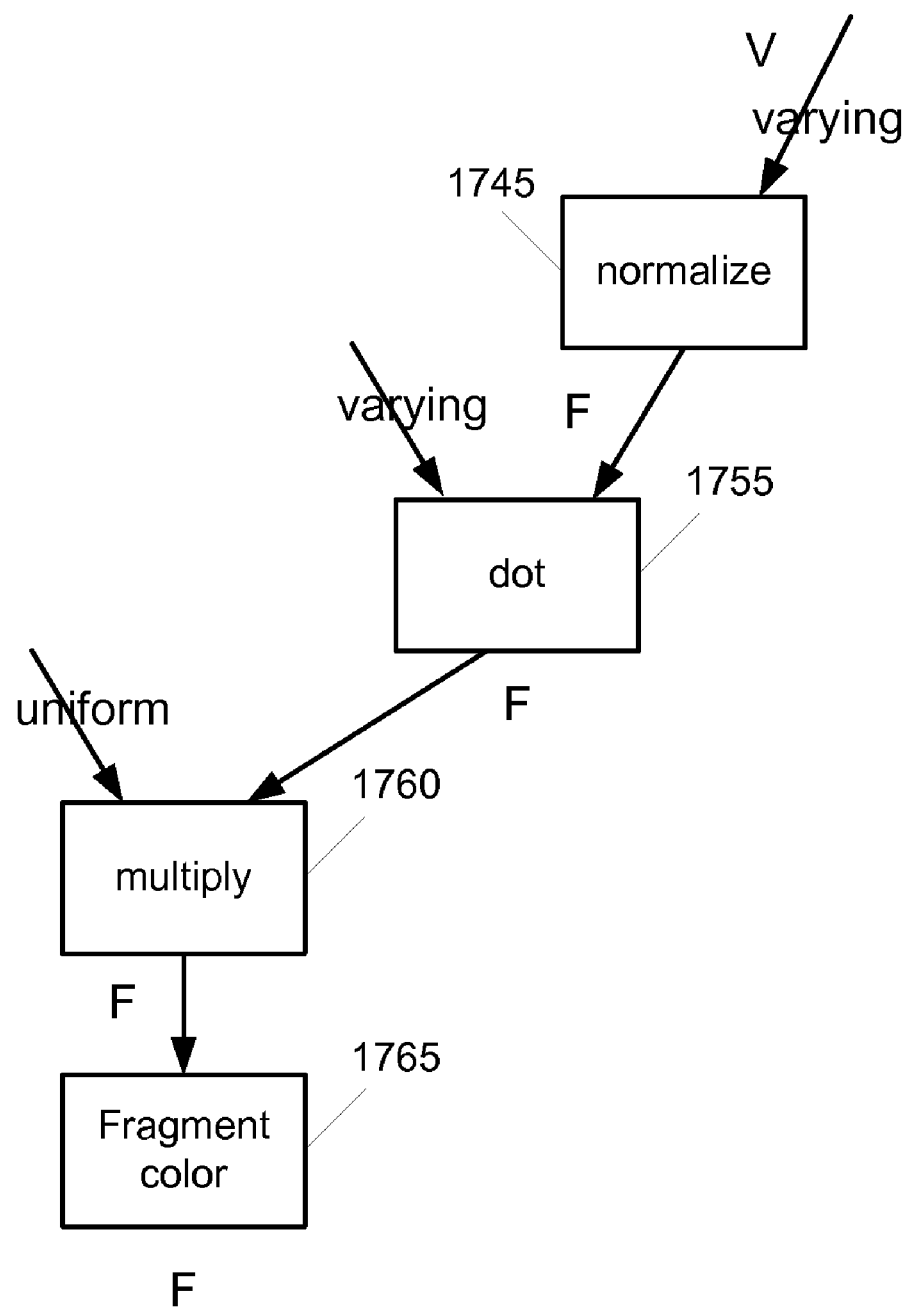
FIG. 24 illustrates the code allocated to the fragment shader for the graph shown in FIG. 17.

In some embodiments, the fragment shader code is generated from nodes labeled as fragment (shown as "F"). FIG. 24 illustrates the code allocated to the fragment shader in the current example. As shown in FIG. 24, the normalize 1745, dot 1755, multiply 1760, and fragment color 1765 operations are labeled as F and are allocated to the fragment shader.

Figure 25:
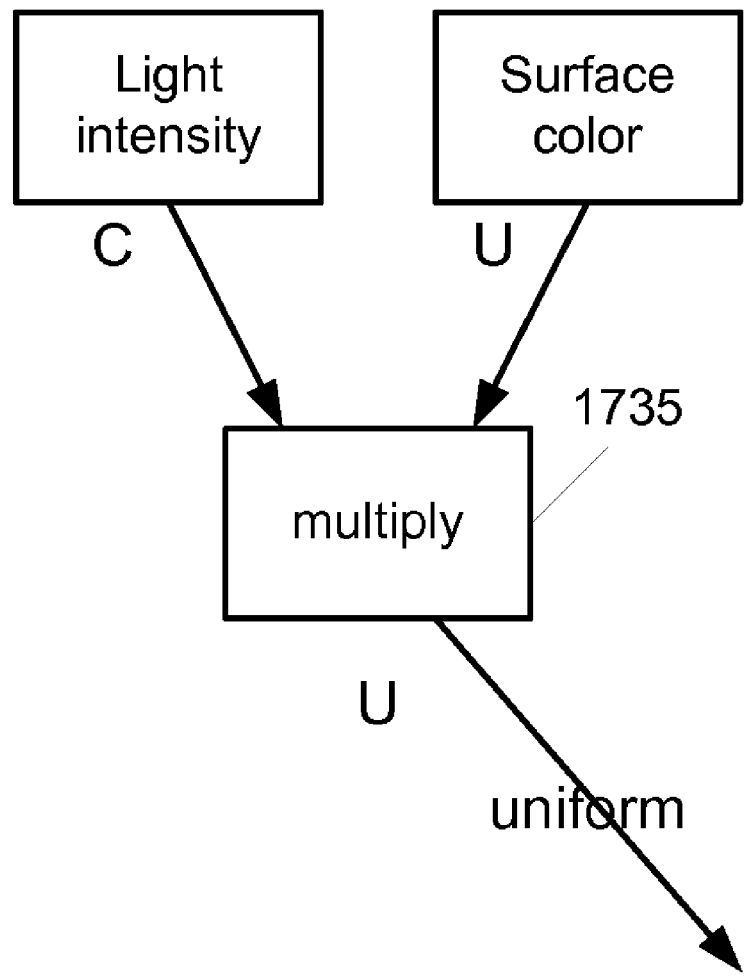
FIG. 25 illustrates the portion of the code allocated to the CPU for the graph shown in FIG. 17.

Next, the process computes (at 1535) the values for uniform inputs. In some embodiments, the uniform calculations are performed by the CPU. FIG. 25 illustrates the portion of the code allocated to the CPU for the current example. As shown, the multiply operation 1735 is allocated to the CPU for execution. Finally, the portions of the graph that are allocated to the fragment and vertex shader are translated to a shader language such as GLSL or ARB which can be passed (at 1540) to OpenGL.

In some embodiments, OpenGL converts the fragment and vertex codes in form suitable for the GPU to execute and sends them to the GPU for execution. In some embodiments, an override can cause all shader code to be executed on the CPU (at a cost of running the shader program slower).

III. Computer System

Figure 27:
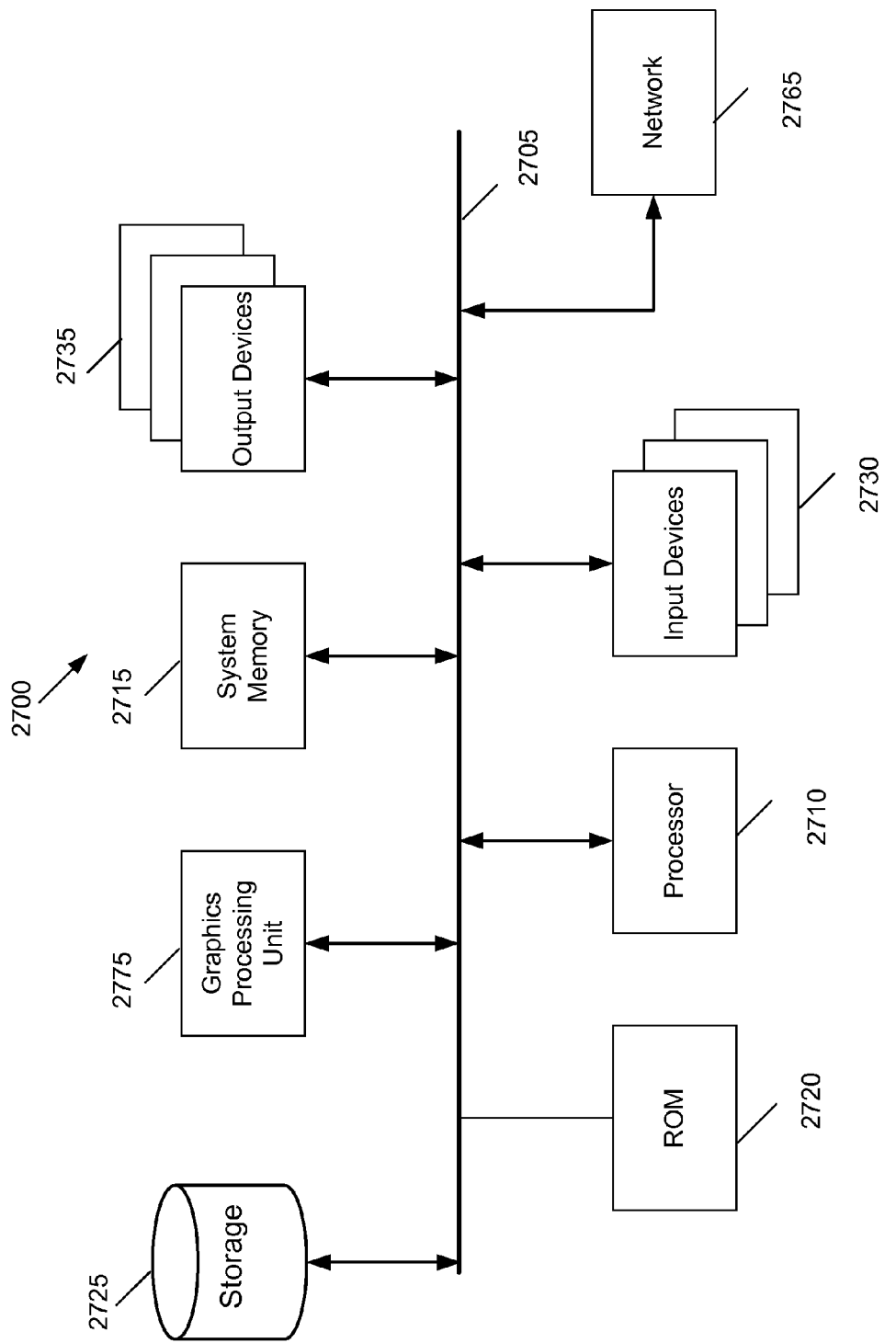
FIG. 27 conceptually illustrates a computer system with which some embodiments of the invention are implemented.

FIG. 27 conceptually illustrates a computer system with which some embodiments of the invention are implemented. The computer system 2700 includes a bus 2705, a processor 2710, a system memory 2715, a read-only memory 2720, a permanent storage device 2725, input devices 2730, and output devices 2735. In some embodiments, the computer system also includes a graphic processing unit (GPU) 2775.

The bus 2705 collectively represents all system, peripheral, and chipset buses that support communication among internal devices of the computer system 2700. For instance, the bus 2705 communicatively connects the processor 2710 with the read-only memory 2720, the system memory 2715, and the permanent storage device 2725.

From these various memory units, the processor 2710 (also referred to as central processing unit or CPU) retrieves instructions to execute and data to process in order to execute the processes of the invention. The read-only-memory (ROM) 2720 stores static data and instructions that are needed by the processor 2710 and other modules of the computer system. The permanent storage device 2725, on the other hand, is a read-and-write memory device. This device is a non-volatile memory unit that stores instruction and data even when the computer system 2700 is off. Some embodiments of the invention use a mass-storage device (such as a magnetic or optical disk and its corresponding disk drive) as the permanent storage device 2725. Other embodiments use a removable storage device (such as a floppy disk or Zip® disk, and its corresponding disk drive) as the permanent storage device.

Like the permanent storage device 2725, the system memory 2715 is a read-and-write memory device. However, unlike storage device 2725, the system memory is a volatile read-and-write memory, such as a random access memory. The system memory stores some of the instructions and data that the processor needs at runtime.

Instructions and/or data needed to perform processes of some embodiments are stored in the system memory 2715, the permanent storage device 2725, the read-only memory 2720, or any combination of the three. For example, the various memory units may contain instructions for processing multimedia items in accordance with some embodiments.

From these various memory units, the processor 2710 retrieves instructions to execute and data to process in order to execute the processes of some embodiments.

The bus 2705 also connects to the input and output devices 2730 and 2735. The input devices enable the user to communicate information and select commands to the computer system. The input devices 2730 include alphanumeric keyboards, touch panels, and cursor-controllers. The input devices 2730 also include scanners through which an image can be input to the computer system. The output devices 2735 display images generated by the computer system. For instance, these devices display IC design layouts. The output devices include printers, pen plotters, laser printers, ink-jet plotters, film recorders, and display devices, such as cathode ray tubes (CRT), liquid crystal displays (LCD), or electroluminescent displays.

Also, as shown in FIG. 27, bus 2705 also couples computer 2700 to a network 2765 through a network adapter (not shown). In this manner, the computer can be a part of a network of computers (such as a local area network ("LAN"), a wide area network ("WAN"), or an Intranet) or a network of networks (such as the Internet). Finally, as shown in FIG. 27, the computer system also includes a graphics processing unit (GPU) 2775. A GPU (also referred to as a visual processing unit or a display processor) is a dedicated graphics rendering device which is very efficient in manipulating and displaying computer graphics. The GPU can be included in a video card (not shown) or can be integrated into the mother board of the computer system along with the processor 2710. Also, the computer system 2700 may be used as a personal computer, a workstation, a game console, or the like. Any or all of the components of computer system 2700 may be used in conjunction with the invention. However, one of ordinary skill in the art will appreciate that any other system configuration may also be used in conjunction with the invention.

While the invention has been described with reference to numerous specific details, one of ordinary skill in the art will recognize that the invention can be embodied in other specific forms without departing from the spirit of the invention. In other places, various changes may be made, and equivalents may be substituted for elements described without departing from the true scope of the present invention. For instance, although several examples are described using C++ as the host language, a person of ordinary skill in the art would realize that other high-level programming languages such as C, C#, Python, Java, etc., can be used without deviating from the teachings of the invention. Also, some examples are given in which portions of the shader program are allocated to vertex shader, fragment shader, and CPU. A person of ordinary skill in the art would realize that the same approach can be easily expended to allocating portion of the shader program to a geometry shader or any other specific shader that may be used in the art.

Furthermore, GLSL and ARB are used as examples of a high-level and an assembly shader programming language. Other shader programming languages can be readily used to practice the teaching of the invention. It should also be appreciated that, although the vertex and fragment codes in the examples given above are sent to the GPU for execution, in some embodiment all or portion of this code can be executed on the CPU (at cost of running the shader program slower. Similarly, performing uniform calculations can be done by the GPU (at a possible cost of slower GPU execution). Thus, one of ordinary skill in the art would understand that the invention is not limited by the foregoing illustrative details, but rather is to be defined by the appended claims.

What claimed is:

1. A method of performing a set of shading operations and a set of non-shading operations for a graphic object in a scene displayed on a device comprising a plurality of processing units, the method comprising:
   executing a subset of the set of non-shading operations, wherein when a non-shading operation refers to a shading operation, the shading operation is stored without being invoked;
   invoking the set of shading operations only when the set of shading operations are needed to render the graphic object;
   after invoking the set of shading operations, determining a frequency of computation for each shading operation;
   allocating the shading operations to the processing units based on the frequency of computation associated with each shading operation; and
   rendering the graphic object based on a plurality of instructions that comprise the set of shading operations.

2. The method of claim 1, wherein allocating shading operations comprises identifying operations for a fragment shader, wherein the fragment shader receives a set of pixels defining the graphic object and performs shading operations once per pixel.

3. The method of claim 1, wherein allocating shading operations comprises identifying operations for a vertex shader, wherein the vertex shader receives a set of vertices as input and performs shading operations once per each vertex.

4. The method of claim 3, wherein a vertex is a vectorized value, wherein a plurality of vertices defines the graphic object.

5. The method of claim 1, wherein the processing units comprise a set of graphical processing units (GPUs), wherein said rendering comprises sending a set of said allocated shading operations to the set of GPUs for execution.

6. The method of claim 1, wherein the processing units comprise a central processing unit (CPU) of a computer, wherein said rendering comprises the CPU performing a set of computations that are uniform throughout the graphic object.

7. The method of claim 1, wherein allocating the shading operations comprises receiving a set of criteria from a user viewing the scene.

8. The method of claim 7, wherein the user selects the set of criteria while creating the scene through a graphical user interface.

9. The method of claim 1, wherein allocating the shading operations comprises receiving a set of criteria selected through a user interface used to view the scene.

10. The method of claim 1, wherein allocating the shading operations to the processing units comprises generating a set of output instructions in a shading language.

11. The method of claim 10, wherein the shading language is one of OpenGL Shading Language (GLSL) and OpenGL Architecture Review Board (ARB) assembly language.

12. The method of claim 10, wherein the shading language is based on open graphics library (OpenGL).

13. The method of claim 1, wherein allocating the shading operations comprises receiving a set of criteria during an execution of said operations.

14. A non-transitory computer readable medium storing a computer program for performing a set of shading operations and a set of non-shading operations for a graphic object in a scene displayed on a device comprising a plurality of processing units, the computer program comprising sets of instructions for:
   executing a subset of the set of non-shading operations, wherein when a non-shading operation refers to a shading operation, the shading operation is stored without being invoked;
   invoking the set of shading operations only when the set of shading operations are needed to render the graphic object;
   determining, after invoking the set of shading operations, a frequency of computation for each shading operation;
   allocating the shading operations to the processing units based on the frequency of computation associated with each shading operation; and
   rendering the graphic object based on a plurality of instructions that comprise the set of shading operations.

15. The non-transitory computer readable medium of claim 14, wherein the set of instructions for allocating shading operations comprises a set of instructions for identifying operations for a fragment shader, wherein the fragment shader receives a set of pixels defining the graphic object and performs shading operations once per pixel.

16. The non-transitory computer readable medium of claim 14, wherein the set of instructions for allocating shading operations comprises a set of instructions for identifying operations for a vertex shader, wherein the vertex shader receives a set of vertices as input and performs shading operations once per each vertex.

17. The non-transitory computer readable medium of claim 14, wherein the set of instructions for allocating the shading operations comprises a set of instructions for receiving a set of criteria selected through a user interface used to view the scene.

18. The non-transitory computer readable medium of claim 14, wherein the set of instructions for allocating the shading operations to the processing units comprises a set of instructions for generating a set of output instructions in a shading language.

* * * * *